United States Patent [19]
Hashimoto

[11] Patent Number: 5,206,907
[45] Date of Patent: Apr. 27, 1993

[54] TELEVISION SIGNAL SCRAMBLING METHOD AND APPARATUS

[75] Inventor: Takashi Hashimoto, Tokyo, Japan

[73] Assignee: Pioneer Electronic Corporation, Tokyo, Japan

[21] Appl. No.: 693,879

[22] Filed: Apr. 30, 1991

[30] Foreign Application Priority Data

May 10, 1990 [JP] Japan .................................. 2-118697

[51] Int. Cl.⁵ .............................................. H04N 7/167
[52] U.S. Cl. ........................................ 380/14; 380/11; 380/15
[58] Field of Search .............................. 380/11, 14, 15

[56] References Cited

U.S. PATENT DOCUMENTS

| | | | |
|---|---|---|---|
| 4,901,349 | 2/1990 | Metzger et al. | 380/11 |
| 5,034,981 | 7/1991 | Leonard et al. | 380/15 |
| 5,058,157 | 10/1991 | Ryan | 380/11 |

OTHER PUBLICATIONS

"Universal Descrambler", Radio Electronics, May 1990, pp. 37-43.

Primary Examiner—Stephen C. Buczinski
Attorney, Agent, or Firm—Sughrue, Mion, Zinn, Macpeak & Seas

[57] ABSTRACT

A video signal from a video-audio source is converted to a digital signal, and stored in a memory. A read clock or a write clock for the memory is temporarily suspended to elongate or shorten a corresponding part of the digital signal. The elongated/shortened digital signal is converted to an analog video signal; and finally sync/blanking signal portions are compressed by a predetermined amount. The elongating operation may be continued and a one horizontal period part of the digital signal may be deleted when an accumulated elongation time has reached or exceeded one horizontal period.

17 Claims, 15 Drawing Sheets

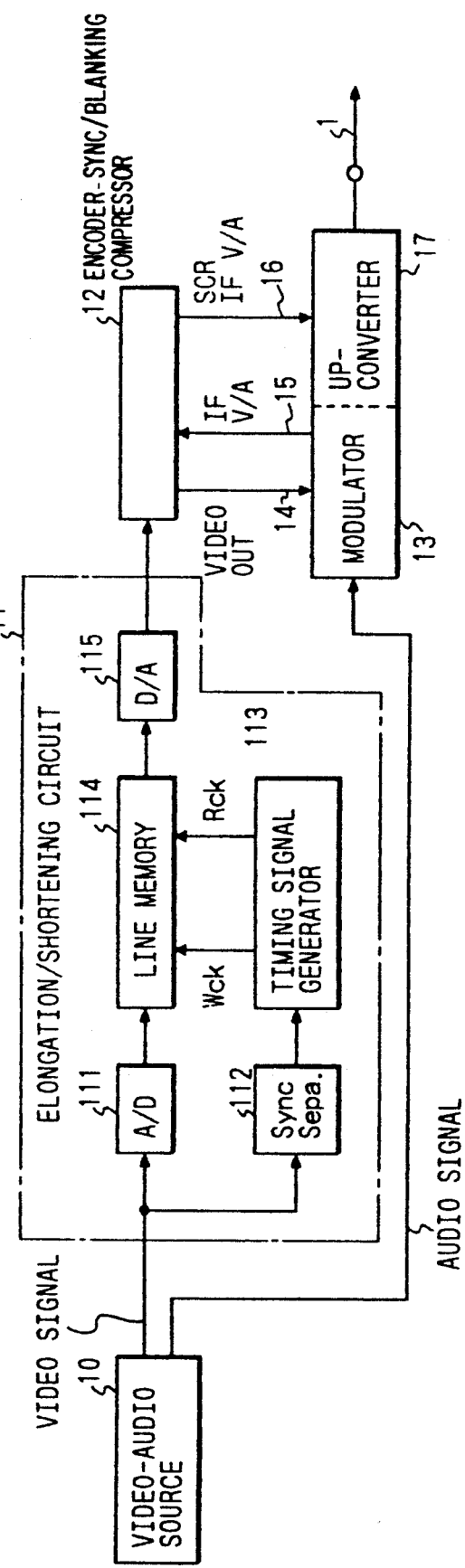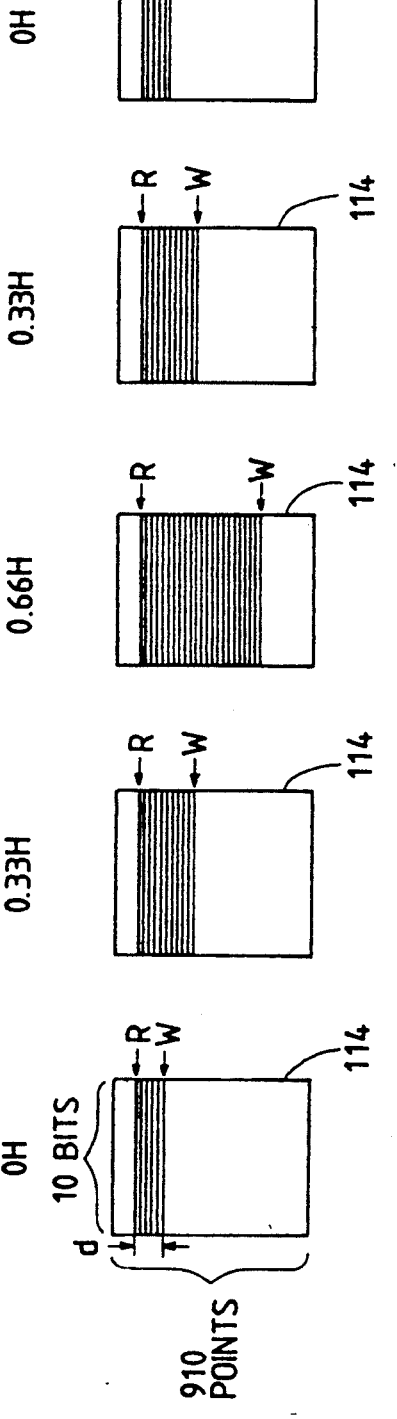

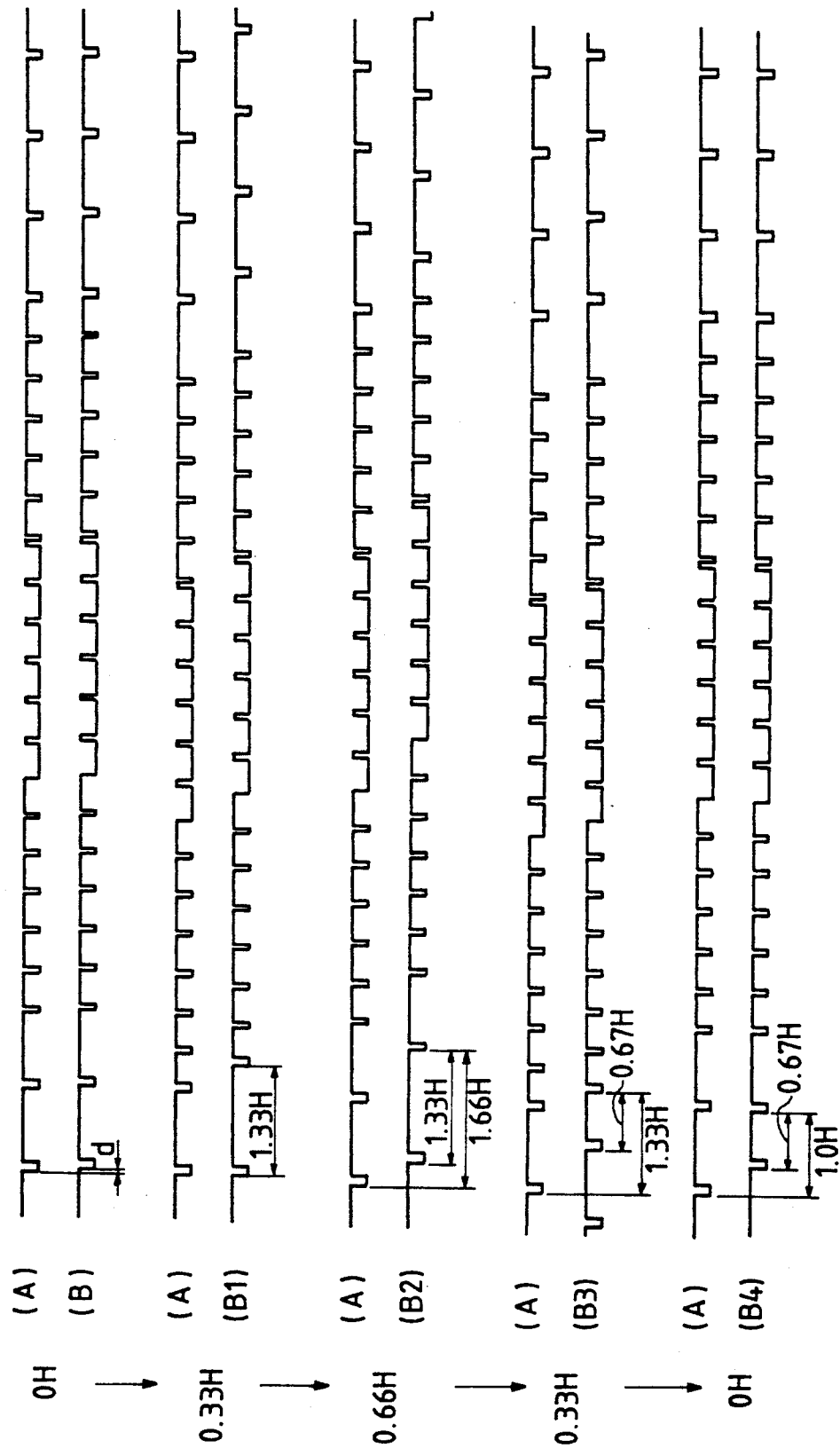

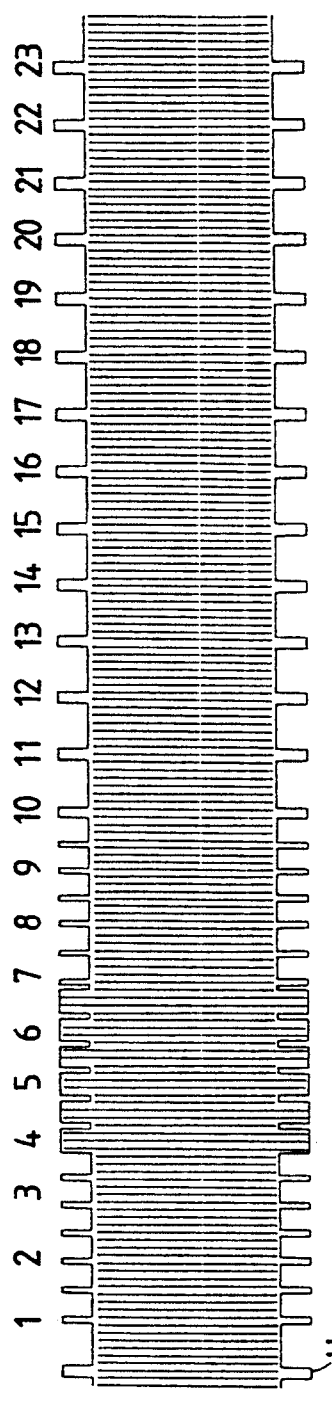
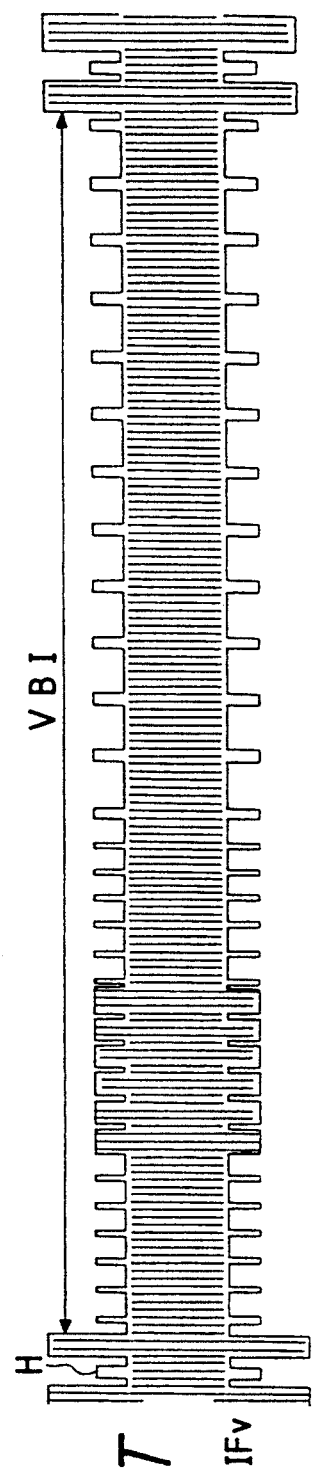
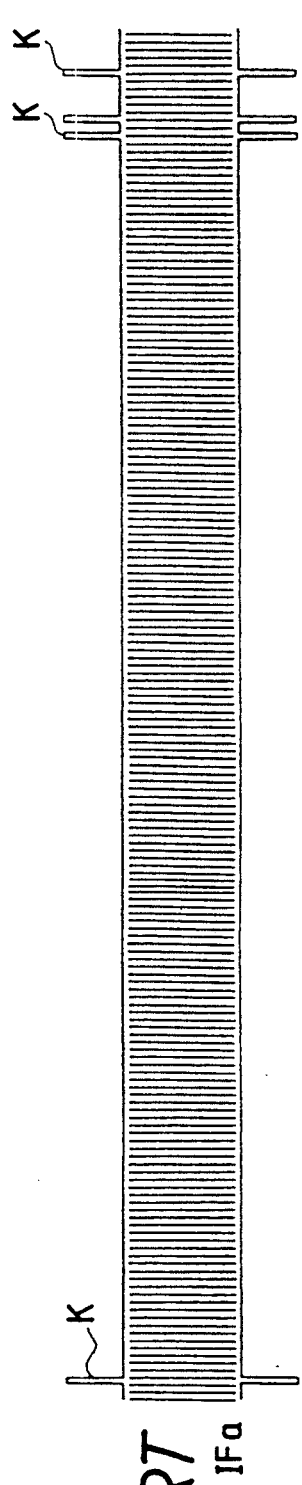
FIG. 6(a) PRIOR ART
FIG. 6(b) PRIOR ART
FIG. 6(c) PRIOR ART

FIG. 10

| FIELD | CLOCKS PER LINE IN OUTPUT VIDEO SIGNAL ||||||| TOTAL CLOCKS | ORIGINAL CLOCKS | INCLEASE OF CLOCKS | ACCUMULATED INCREASE OF CLOCKS | SHIFT TIME (μsec) | ACCUMULATED SHIFT TIME (μsec) |
|---|---|---|---|---|---|---|---|---|---|---|---|---|---|
| | 1-260H | 261H | 262H | 263-522H | 523H | 524H | 525H | | | | | | |
| 1 | 914 | 908 | 0 | | | | | 238548 | 238420 | 128 | 128 | 8.94 | $X_1$=8.94 |
| 2 | | | | 914 | 914 | 908 | 0 | 239462 | 239330 | 132 | 260 | 9.22 | $X_2$=18.16 |
| 3 | 914 | 908 | 0 | | | | | 238548 | 238420 | 128 | 388 | 8.94 | $X_3$=27.10 |
| 4 | | | | 914 | 914 | 908 | 0 | 239462 | 239330 | 132 | 520 | 9.22 | $X_4$=36.32 |
| 5 | 914 | 908 | 0 | | | | | 238548 | 238420 | 128 | 648 | 8.94 | $X_5$=45.26 |
| 6 | | | | 914 | 914 | 908 | 0 | 239462 | 239330 | 132 | 780 | 9.22 | $X_6$=54.48 |
| 7 | 914 | 0 | 0 | | | | | 237640 | 238420 | -780 | 0 | -54.48 | $X_7$= 0.00 |
| 8 | | | | 914 | 914 | 908 | 0 | 239462 | 239330 | 132 | 132 | 9.22 | $X_8$=9.22 |
| 9 | 914 | 908 | 0 | | | | | 238548 | 238420 | 128 | 260 | 8.94 | $X_9$=18.16 |
| 10 | | | | 914 | 914 | 908 | 0 | 239462 | 239330 | 132 | 392 | 9.22 | $X_{10}$=27.36 |
| 11 | 914 | 908 | 0 | | | | | 238548 | 238420 | 128 | 520 | 8.94 | $X_{11}$=36.32 |
| 12 | | | | 914 | 914 | 908 | 0 | 239462 | 239330 | 132 | 652 | 9.22 | $X_{12}$=45.54 |
| 13 | 914 | 908 | 0 | | | | | 238548 | 238420 | 128 | 780 | 8.94 | $X_{13}$=54.48 |
| 14 | | | | 914 | 910 | 0 | 0 | 238550 | 239330 | -780 | 0 | -54.48 | $X_{14}$= 0.00 |
| 1 | 914 | 908 | 0 | | | | | 238548 | 238420 | 128 | 128 | 8.94 | $X_1$=8.94 |
| 2 | | | | 914 | 914 | 908 | 0 | 239462 | 239330 | 132 | 260 | 9.22 | $X_2$=18.16 |
| 3 | 914 | 908 | 0 | | | | | 238548 | 238420 | 128 | 388 | 8.94 | $X_3$=27.10 |
| 4 | | | | 914 | 914 | 908 | 0 | 239462 | 239330 | 132 | 520 | 9.22 | $X_4$=36.32 |
| 5 | 914 | 908 | 0 | | | | | 238548 | 238420 | 128 | 648 | 8.94 | $X_5$=45.26 |
| 6 | | | | 914 | 914 | 908 | 0 | 239462 | 239330 | 132 | 780 | 9.22 | $X_6$=54.48 |
| 7 | 914 | 0 | 0 | | | | | 237640 | 238420 | -780 | 0 | -54.48 | $X_7$= 0.00 |
| 8 | | | | 914 | 914 | 908 | 0 | 239462 | 239330 | 132 | 132 | 9.22 | $X_8$=9.22 |

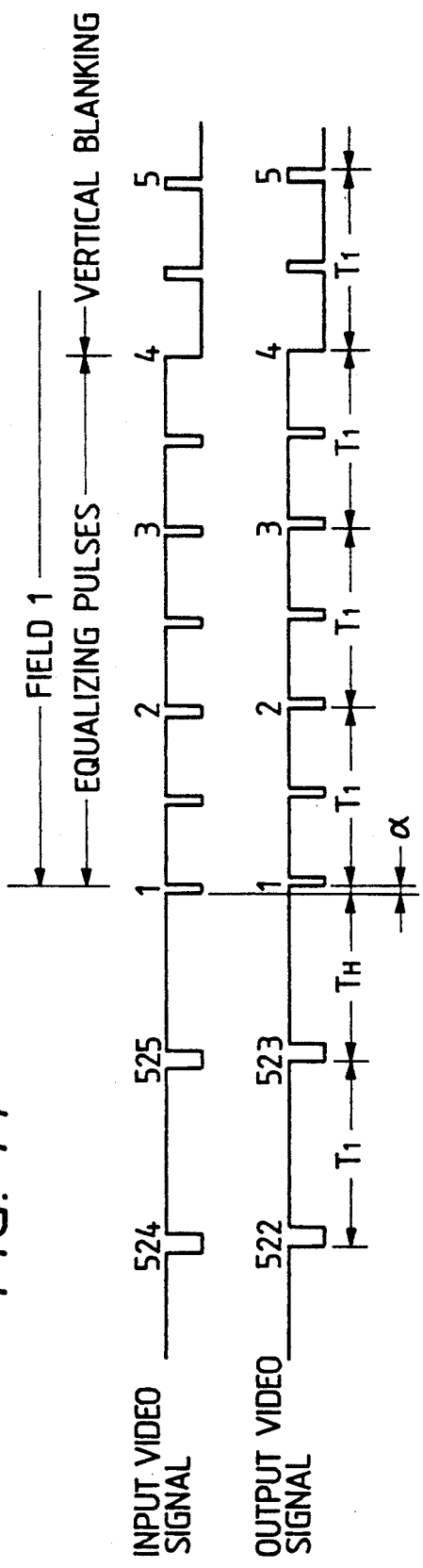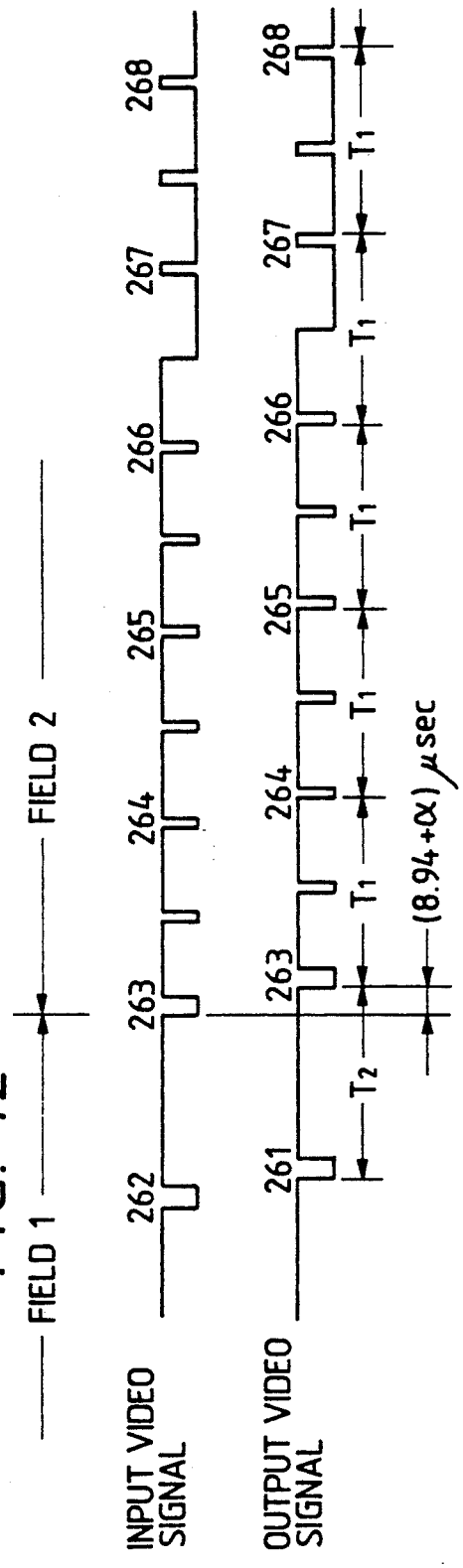

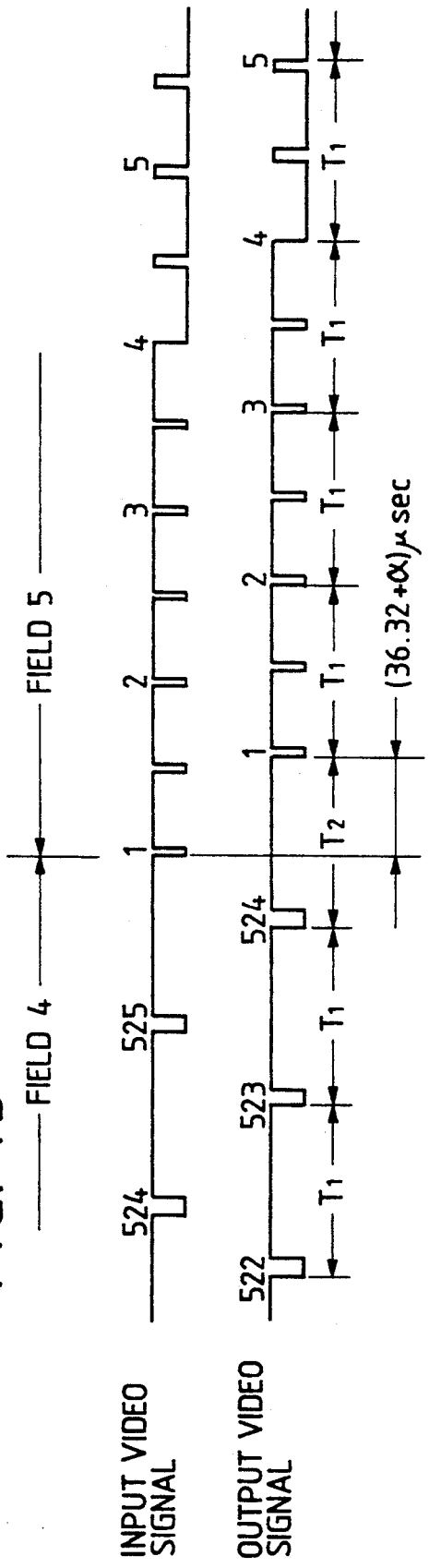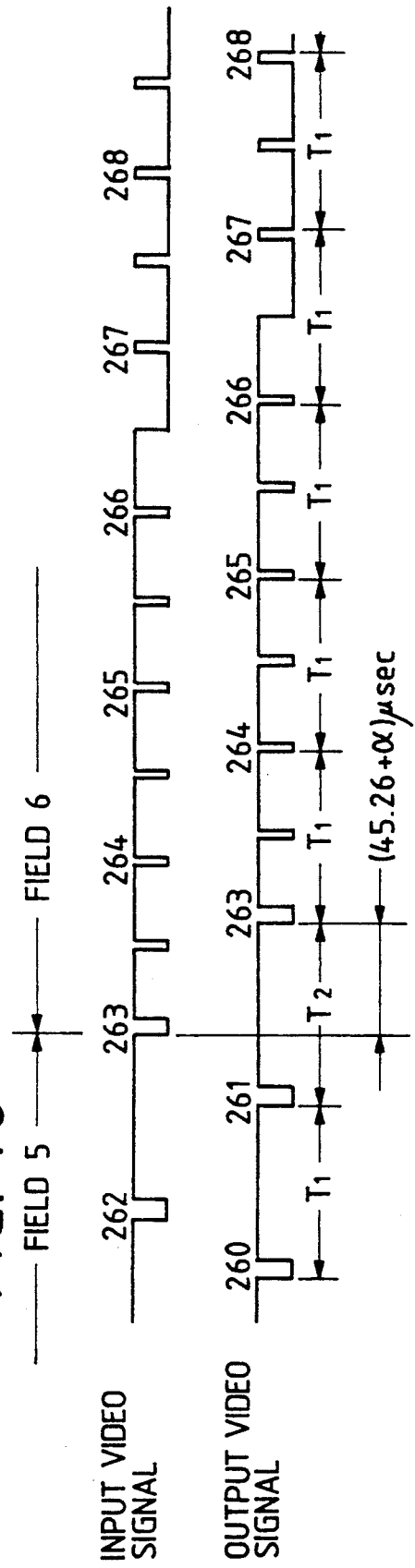

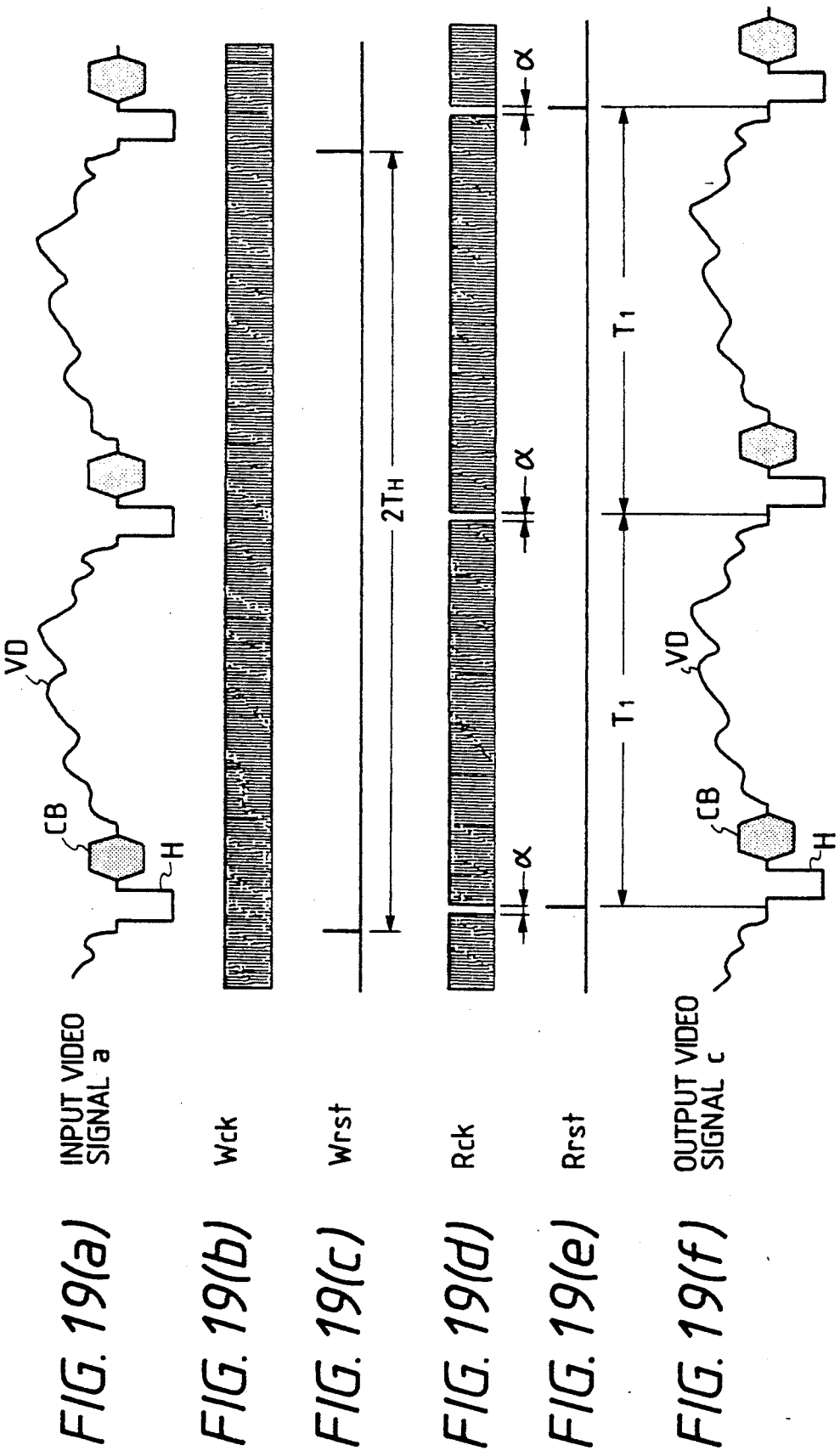

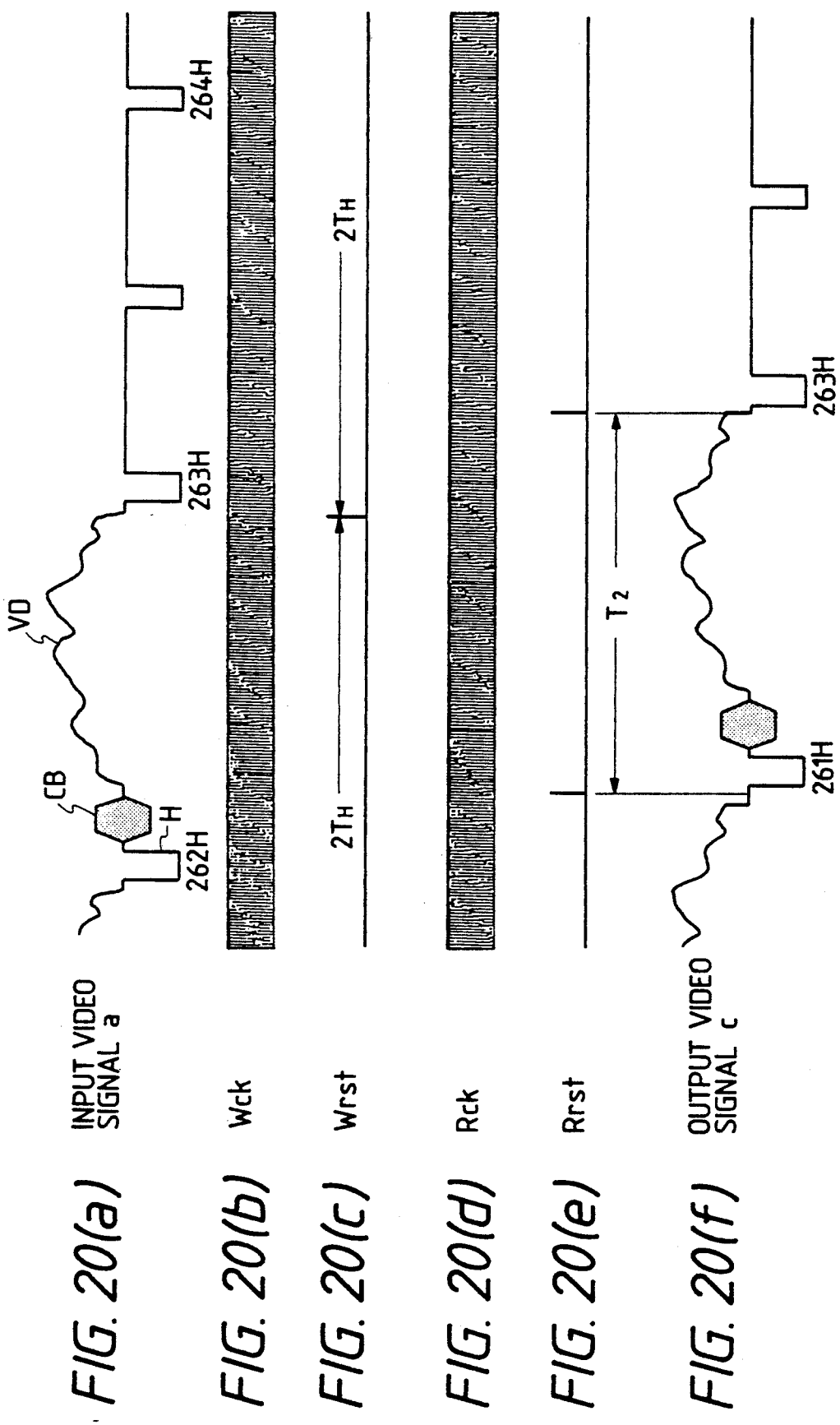

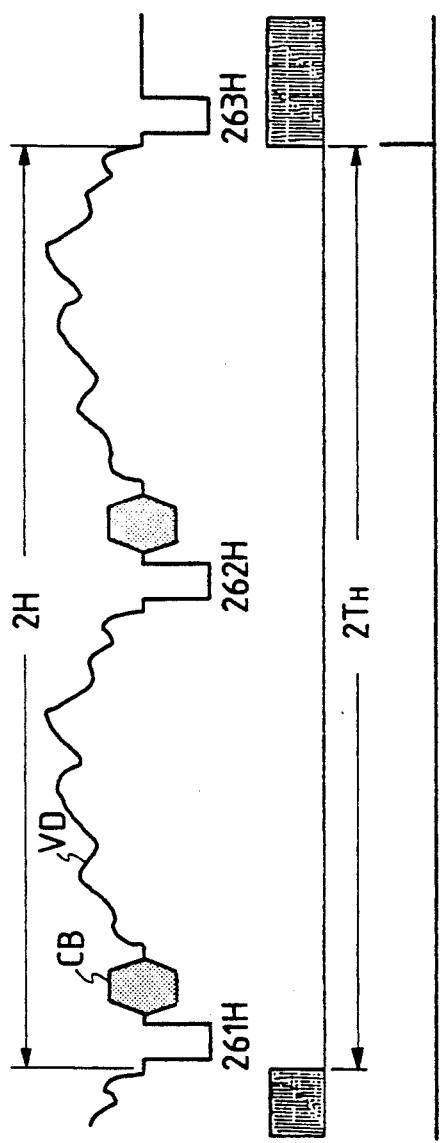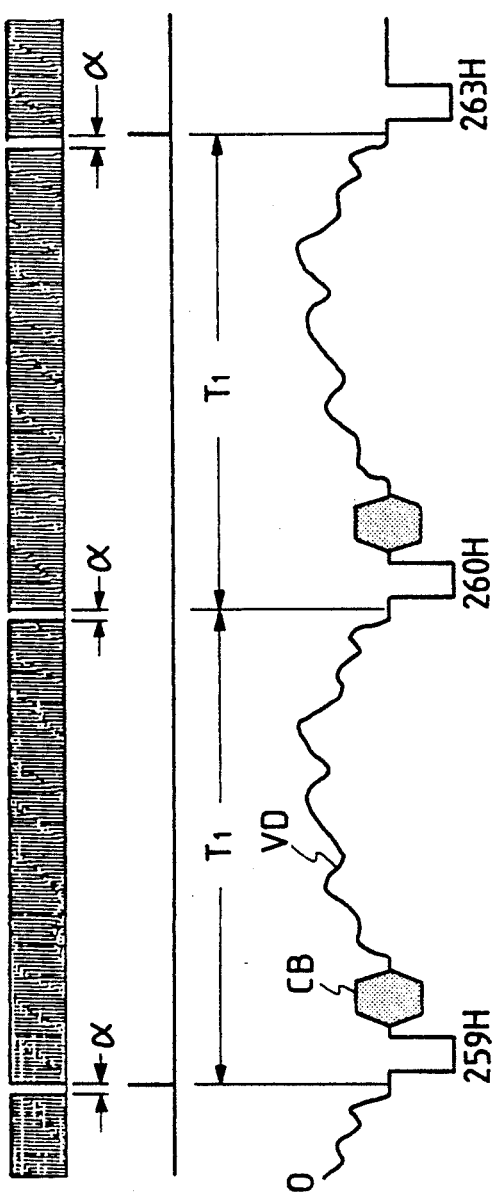

TELEVISION SIGNAL SCRAMBLING METHOD AND APPARATUS

BACKGROUND OF THE INVENTION

The present invention relates to a television signal scrambling method and apparatus for use in a CATV system in which a television signal is sent from a center station to a large number of terminals connected to the center station through cables.

In general, CATV systems are constructed such that programs produced in a center station or programs put on the air are transmitted to terminals through cables.

In such CATV systems, fees are imposed on part of the programs produced in the center station. For example, a viewer on each terminal side is charged a predetermined fee when he watches a chargeable program.

In order to prevent illegal watching of chargeable programs, a scrambling technique is employed on the center side to spoil television signals of chargeable programs so that usual television receivers cannot reproduce normal television pictures.

On the other hand, a descrambler for returning scrambled television signals to their original signals is provided on the side of subscribers who are permitted to watch chargeable programs.

Various methods have been proposed as the aforementioned scrambling and descrambling techniques. Among those methods is a gated sync suppression (GSS) method in which a television signal is scrambled by compressing horizontal sync signal portions and vertical blanking interval (VBI) portions of a television signal by several dBs so that the horizontal and vertical synchronization cannot be established in usual television receivers, and permitted terminals descramble the scrambled television signal by expanding the compressed horizontal sync signal portions and VBI portions to the original levels. In another method, only horizontal sync signal portions are compressed/expanded.

FIGS. 6(a)-6(c) show signal waveforms each including a VBI portion continued from the last horizontal sync signal portion, and illustrate how the scrambling is performed by the GSS method.

FIG. 6(a) shows a normal video signal after modulated to an intermediate frequency video signal IFv. In the center station, horizontal sync signal (H) portions and VBI portions of the intermediate frequency video signal IFv are compressed by a predetermined amount, for example, about 6 dB, as shown in FIG. 6(b).

Further, in the center station, key signals K indicating the timing of compression of the horizontal sync signal portions are superposed on an intermediate frequency audio signal IFa. The resultant intermediate frequency audio signal IFa and the compressed intermediate frequency video signal IFv are combined and converted to an RF signal to be transmitted to the respective terminals.

On the other hand, in each terminal, the intermediate frequency audio signal IFa is detected from the RF signal received. Further, the key signals K are detected from the signal IFa. Then, the digitally compressed horizontal sync signal portions in the video signal are expanded by about 6 dB, corresponding to the compression amount in the transmitter side, on the basis of the timing of the detected key signals K. At the same time, the VBI portions are expanded by about 6 dB, corresponding to the compression amount in the transmitter side by detecting the absence period of the key signal which corresponds to the VBI. Thus, the process for returning the compressed signal to the original television signal is completed.

However, in the case of the television signal scrambled by the aforementioned scrambling method, it is still possible for illegal CATV terminals to reproduce television pictures relatively easily by descrambling the television signal.

That is, the operation of descrambling the horizontal sync signal portions can be made easily if the timing relationship between the key signal K superposed on the intermediate frequency audio signal IFa and the digitally compressed horizontal sync signal portion in the video signal can be found. Further, the VBI portions can be descrambled by detecting the VBIs in which the key signals are not superposed successively.

To prevent the illegal reproduction of television pictures, a plurality of timing relationships between the digitally compressed horizontal sync signal portion of the video signal IFv and the key signal K superposed on the audio signal IFa may be provided, and the timing relationship may be varied with lapse of time, to thereby make it impossible to descramble the television signal by the aforementioned illegal method.

On the other hand, the timing information is encoded to produce timing mode data. For example, the timing mode data is superposed on the intermediate frequency audio signal IFa at a prescribed position, and transmitted to the regular descramblers. in each descrambler, the timing mode data is decoded and the expansion timing is controlled so as to become identical to the compression timing on the center side.

Recently, however, an apparatus of descrambling a television signal illegally by detecting the compressed portions from the scrambled video signal itself without use of the key signals K has been proposed as described in the article, "UNIVERSAL DESCRAMBLER", Radio Electronics, May, 1990.

FIG. 7 is a block diagram showing the conceptual construction of such an apparatus.

A television signal received through a cable 1 is converted, by a frequency converter 2, into a signal having a frequency of an empty channel (e.g., a second channel) which has no on-air television signal in the area of descrambler installation. The signal is applied to both a descrambling circuit 3 and a video detector circuit 4a. The video signal detected by the video detector circuit 4a is applied to a 3.58 MHz timing generator 4. In the timing generator 4, an output synchronized with color burst signals contained in the video signal is extracted.

As is well known, the color burst signal exists just after the horizontal sync signal. Accordingly, when the frequency and phase of the color burst signal is recognized, the phase of the video signal compressed on the center side, that is, in the scrambler, can necessarily be recognized on the basis of the relationship: 3.58 MHz (color burst-frequency)×2/455=15.74 kHz (horizontal sync frequency).

The lock output of the timing generator 4 is applied to a sync generator 5. For example, the sync generator 5 is constituted by a frequency-divider-type generator used in video cameras or the like. Horizontal sync reset and vertical sync reset switches 6 and 7 are provided in association with the timing generator 4 and the sync generator 5, respectively. When the screen of a television receiver is watched under the condition that both the switches 6 and 7 are on, a vertical bar caused by the horizontal blanking and a horizontal bar caused by the vertical blanking are observed as shown in FIG. 8(a). The vertical bar caused by the horizontal blanking moves left or right, and the horizontal bar caused by the vertical blanking moves up or down. If the horizontal sync reset switch 6 is turned off at the point of time when the vertical bar reaches the left or right end of the screen, only the horizontal bar caused by the vertical blanking remains in the screen as shown in FIG. 8(b), and moves up or down. When the vertical sync reset switch 7 is further turned off at the point of time when the horizontal bar reaches the top or bottom end of the screen, the timing of compression of the television signal can be set to obtain normal television pictures as shown in FIG. 8(c).

Then, a timing generator 8 operates on the basis of the aforementioned set timing, so that a control signal is fed from the timing generator 8 to the descrambling circuit 3. The descrambling circuit 3, receiving the control signal from the timing generator 8, controls a switch SW suitably so that a contact a is selected during periods of the horizontal sync signal portions and VBI portions to just pass the signal, and that a contact b is selected during periods of the other portions to feed the signal to an output terminal 9 through, e g., an 6 dB attenuator 31 having an attenuation amount equal to the compression amount on the center side. Thus, the descrambled, i.e., original television signal can be obtained at the output terminal 9.

As described above, there exist descramblers which can analyze the video signal itself scrambled by the GSS method, and can descramble it.

SUMMARY OF THE INVENTION

The present invention has been made in view of the aforementioned circumstances. Accordingly, an object of the invention is to provide a television signal scrambling method and apparatus in which regular descramblers currently in use can be used as they are, and in which a scrambled television signal cannot be descrambled by the aforementioned illegal descrambler.

Another object of the invention is to provide a television signal scrambling method and apparatus in which a picture of good quality can be reproduced in terminals using a descrambled television signal.

According to the invention, a scrambling apparatus of a television signal including a video signal and an audio signal, comprises:

analog-to-digital conversion means for converting a first video signal to a digital signal;

memory means for storing the digital signal;

timing generating means for providing a write clock and a read clock to the memory means to write the digital signal to and read the digital signal from the memory means, the provision of the read clock or write clock being temporarily suspended so that a corresponding part of the read-out digital signal is elongated or shortened, respectively;

digital-to-analog conversion means for converting the digital signal output from the memory means to a second video signal; and scrambling means for compressing a horizontal sync signal portion and/or a vertical blanking interval portion of the second video signal by a predetermined amount.

According to the aforementioned construction of the invention, a part of the digital video signal is elongated/shortened by temporarily suspending the provision of the read and write clocks to the memory means, respectively. The horizontal sync signal portions and/or vertical blanking interval portions of the elongated/shortened video signal are compressed by an encoder by a predetermined amount. Accordingly, even if an attempt to find out the compressed horizontal sync signal portions and/or vertical blanking interval portions on the basis of the detection of color burst signals is made on a terminal side using the descrambler as shown in FIG. 7, the synchronization with the elongated/shortened television signal cannot be established; that is, the successful descrambling cannot be conducted.

BRIEF DESCRIPTION OF THE DRAWINGS

FIG. 1 is a block diagram showing a scrambling apparatus according to a first embodiment of the present invention;

FIG. 4 is a timing chart showing how a video signal is elongated/shortened in the first embodiment;

FIGS. 5(a)–5(e) are charts illustrating the operation of a line memory in the elongation/shortening operation of FIG. 4;

FIGS. 6(a)–6(c) are waveforms for explaining a scrambling operation;

FIG. 10 is a chart for explaining the elongating operation of the second embodiment;

FIGS. 11–18 are timing charts for explaining the elongating operation of the second embodiment; and FIGS. 19(a)–19(f), 20(a)–20(f) and 21(a)–21(f) are timing charts for explaining how a video signal is written to and read from a 2-line memory.

DETAILED DESCRIPTION OF THE PREFERRED EMBODIMENTS

Figure 2A:
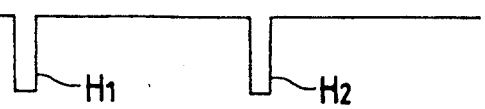
FIGS. 2(a)–2(d) and 3(a)–3(d) are timing charts for explaining the operation of the first embodiment.

An embodiment of the present invention will be described below with reference to the drawings.

FIG. 1 shows an embodiment of the present invention, and shows the configuration of a center-side scrambling apparatus.

In the drawing, reference numeral 10 designates a video-audio source such as a video tape recorder and a video disc player. A video signal from the video-audio source 10 is applied to an A/D converter 111 of a elongation/shortening circuit 11 and therein converted into a digital signal. On the other hand, the video signal is applied to a sync separator circuit 112, where a sync signal is extracted from the video signal. The sync signal extracted by the sync separator circuit 112 is applied to a timing signal generator circuit 113. A write clock signal Wck and a read clock signal Rck generated from the timing signal generator circuit 113 are applied to a line memory 114, so that the digital video signal from the A/D converter 111 is elongated/shortened according to a pattern determined by the input timing of the two clock signals Wck and Rck, and then fed to a D/A converter 115.

The D/A converter 115 converts the digital video signal elongated/shortened by means of the line memory 114 into an analog signal to be fed to an encoder 12. The video signal thus fed to the encoder 12 is simply passed through the encoder 12 to be provided from a video output terminal of the encoder 12 to a video input terminal of a modulator 13 through a line 14.

On the other hand, an audio signal from the video-audio source 10 is applied to the modulator 13. The modulator 13 converts both the video signal from the encoder 12 and the audio signal into IF signals, respectively.

The IF video signal IFv and the IF audio signal IFa modulated by the modulator 13 are provided to the encoder 12 through a line 15. In the encoder 12, the IF video signal IFv is compressed at a predetermined compression rate, for example, 6 dB, on the basis of the horizontal sync signal portions and vertical blanking interval (VBI) portions contained in the video signal obtained by the elongation/shortening circuit 11 and, at the same time, key signals K are superposed on the IF audio signal IFa at positions corresponding to the horizontal sync signal portions. There are provided a plurality of positions where the key signal K is to be superposed. The superposing position, i.e., the timing relationship with the horizontal sync signal portion is changed with lapse of time. The plurality of timing relationships are encoded as timing mode data in the encoder 12. The timing mode data is superposed on the intermediate frequency audio signal IFa at a prescribed position.

The IF video signal IFv containing the horizontal sync signal portions and VBI portions compressed as described above and the IF audio signal IFa containing the key signals and timing mode data superposed as described above are applied to an up-converter 17 from the encoder 12 through a line 16. The up-converter 17 converts the IF signals into an RF signal to be fed to a transmission line constituted by a coaxial cable 1.

FIGS. 2(a)–2(d) are waveforms for explaining the elongating operation of the elongation/shortening circuit 11.

Figure 2B:
Figure 2C:

FIG. 2(a) shows a horizontal sync signals contained in video signal given from the video-audio source 10. FIG. 2(b) shows a write clock signal Wck of 14 MHz, and FIG. 2(c) shows a read clock signal Rck of 14 MHz. As shown in FIG. 2(c), the read clock signal Rck is controlled by the timing signal generator circuit 113 so that the output from the line memory 114 is suspended during a period $t_1$, which is about one-third of the horizontal period (1H), between the first and second horizontal sync pulses H1 and H2.

Figure 2D:
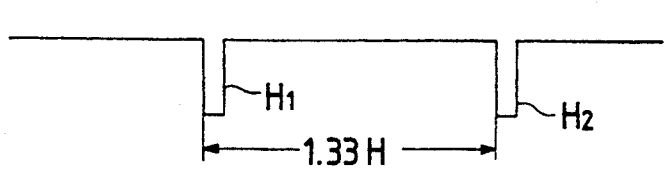

As a result, the interval between the first and second horizontal sync pulses H1 and H2 in the video signal sent from the D/A converter 115 is elongated to 1.33 H as shown in FIG. 2(d). In other words, the horizontal period is expanded by $(\frac{1}{3})$H.

Figure 3A:
Figure 3B:

FIGS. 3(a)–3(d) show the case in which the horizontal period is shortened. Like FIG. 2(a), FIG. 3(a) shows horizontal sync signals in the video signal. FIG. 3(b) shows a write clock signal Wck of 14 MHz. As shown in the drawing, the write clock signal Wck is controlled by the timing signal generator circuit 113 so that the input to the line memory 114 is suspended during a period $t_1$, about one-third the horizontal period (1 H).

Figure 3C:
Figure 3D:
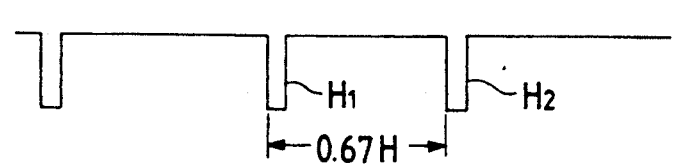

On the other hand, a read clock signal Rck of 14 MHz is continuously provided as shown in FIG. 3(c). As a result, the interval between the first and second horizontal sync pulses H1 and H2 in the video signal sent from the D/A converter 115 is shortened to 0.67 H as shown in FIG. 3(d). This means that the video signal which has been elongated by 0.33 H in the manner of FIGS. 2(a)–2(d) can be returned to its original state.

FIG. 4 shows an example of controlling the elongation/shortening circuit 11, in which the video signal is successively elongated/shortened in a horizontal line of the input video signal (A) which does not appear on the screen of a usual television receiver, in accordance with the input timing of the write clock signal Wck and the read clock signal Rck. Each signal waveform in FIG. 4 shows a VBI portion continued from the last horizontal sync signal portion.

That is, as shown in the uppermost stage of FIG. 4, an input video signal (A) is first output as an output video signal (B) with a small delay d simply caused by the writing and reading operations. When the read clock signal Rck is suspended during the period $t_1$, the sync signal is shifted by 0.33 H. As a result, this horizontal line is elongated to 1.33 H, and a signal (B1) is obtained.

When the read clock signal Rck is further suspended during the period $t_1$, the sync signal is shifted by 0.66 H from the original position in the signal (A). As a result, this horizontal line is further elongated to 1.66 H, and a signal (B2) is obtained.

When the write clock signal Wck is then suspended during the period $t_1$, the sync signal is shifted back by 0.33H. As a result, the output timing is advanced as represented by a signal (B3).

When the write clock signal Wck is further suspended during the period $t_1$, the sync signal is further shifted back by 0.33 H. As a result, the output timing is further advanced as represented by a signal (B4). The phase of the output signal (B4) becomes equal to that of the output signal (B).

When the video signal is elongated/shortened in the sequence as shown in FIG. 4, the change of the write/read timing of the line memory 114 is as shown in FIGS. 5(a)–5(e). From FIG. 5(a), one can see that the sampling number per line and the quantizing bit number of the A/D conversion in the A/D converter 111 are 910 points and 10 bits, respectively.

As described above, the phase of the video signal can be successively changed by controlling the timing of the write clock signal Wck and the read clock signal Rck with the unit shift time $t_1$, for example, $(\frac{1}{3})$H.

Although the above description was made of the case where the video signal is elongated/shortened with the fixed unit shift time of $(\frac{1}{3})$H, the invention can be applied to the case where the unit shift time is variable. Further, the elongation/shortening operation may be performed in a temporally irregular manner, i.e., in a random manner.

In the meantime, the inventor has realized that the above-described first embodiment may cause a problem that some fluctuation occurs at the top portion of a TV screen due to sync-drawing by a PLL circuit of a timing circuit in a terminal apparatus. A second embodiment of the invention has been made to solve this problem, in which the horizontal period of the digital video signal is elongated/shortened (i.e., the position of the horizontal sync signal is shifted) at a small rate of, e.g., 0.28 μsec per line.

Figure 9:
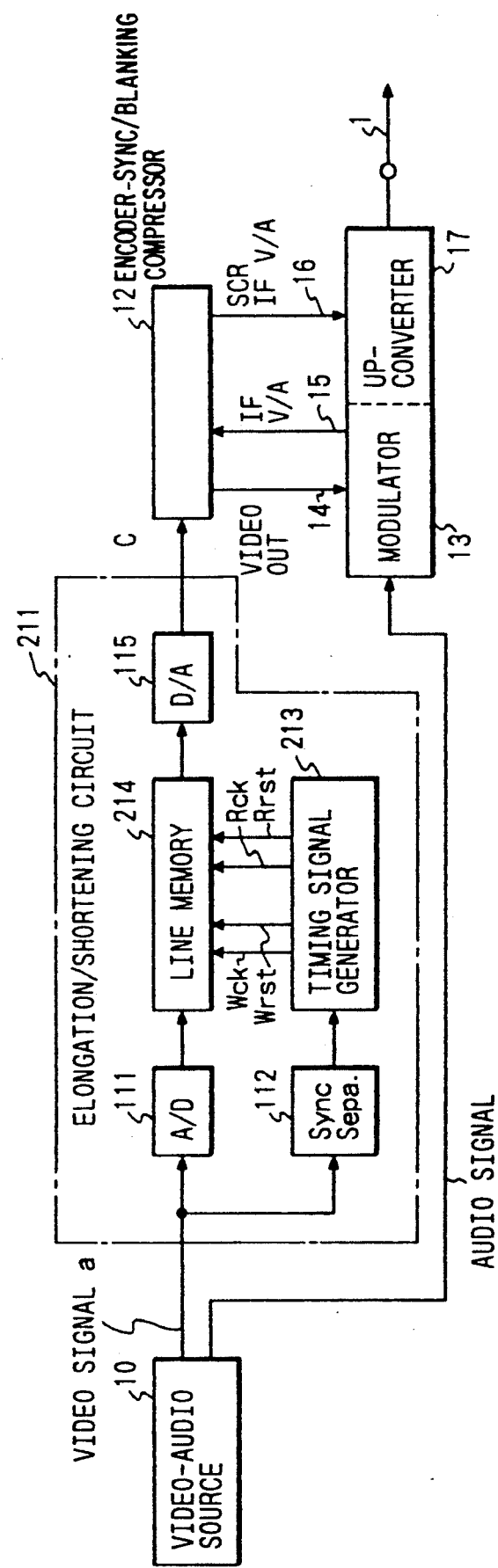
FIG. 9 is a block diagram showing a scrambling apparatus according to a second embodiment of the invention.

FIG. 9 shows the configuration of a center-side scrambling apparatus according to such a second embodiment, which is different from the first embodiment in that, in an elongation/shortening circuit 211, the 2-line memory 214 is employed instead of the line memory 114, and a timing signal generator 213 provides a 2-line memory 214 with a write reset signal Wrst and a read reset signal Rrst in addition to the write clock signal Wck and the read clock signal Rck. Each of the reset signals Wrst and Rrst is basically provided to the 2-line memory 214 approximately every 2 horizontal periods, and resets the address of the memory 214 to zero. The 2-line memory 214 may consist of a RAM.

The basic concept of the second embodiment is that the horizontal period is continuously elongated (i.e., the position of the horizontal sync signal is continuously shifted in the same direction) basically at a constant rate of $\alpha$ μsec per line, and when the accumulated elongation time (i.e., shift time) has exceeded one horizontal period, the accumulated one horizontal period part of the video signal is deleted.

The shift time $\alpha$ may be selected to be an integer multiple of the color burst signal period. In the present embodiment, the color burst signal period itself, 0.28 μsec (4 sampling periods), is selected as the shift time $\alpha$. The accumulated shift time is made zero every integer multiple of the vertical period, in the embodiment, every 7 vertical periods.

FIG. 10 is a chart specifically describes how the horizontal period elongation is performed. In the same manner as the first embodiment, the horizontal period is elongated by temporarily suspending the provision of the read clock signal Rck from the timing signal generator 213. The write and read clock signal rate is selected to be the same as the sampling rate of the A/D converter 111, i.e., 910 clocks per regular horizontal period.

Referring to FIG. 10, the timing signal generator 213 provides the write clock signal Wck and the read clock signal Rck to the 2-line memory 214 so that, in field 1 (odd field), the digital video signal output from the 2-line memory 214 is elongated by 4 clocks to have a 914 clock period in lines 1260, and shortened by 2 clocks to have a 908 clock period in line 261. The list line, i.e., line 262 is entirely deleted (described later). As a result, the accumulated shift time x: at the end of field 1 is 8.94 μsec (128 clocks) as shown in FIG. 10.

In field 2 (even field), the digital video signal from the 2-line memory 214 is elongated to have a 914 clock period in lines 263–523, and is shortened to a 908 clock period in line 524. The last line, i.e., line 525 is entirely deleted. As a result, the accumulated shift time $x_2$ at the end of field 2 is (8.94+9.22)=18.16 μsec (260 clocks).

The same operation is repeated for fields 3–6 to produce an accumulated shift time $x_6$ of 54.48 μsec (780 clocks). In field 7, the digital video signal is elongated to a 914 clock period in lines 1–260, and lines 261 and 262 are entirely deleted (described later). As a result, field 7 itself produces a shift time of −54.48 μsec (−780 clocks), so that the accumulated shift time is completely reset, that is, $x_7$ is 0.00 μsec.

The similar operation is performed in fields 8–14 as shown in FIG. 10.

FIGS. 11–18 illustrate the above elongating operation more specifically comparing the positions of the horizontal sync signal in the digital video signals input to and output from the 2-line memory 214. In these figures, $T_H$ means the regular horizontal period, 63.5 μsec; $T_1$, a 914 clock period; and $T_2$, a 908 clock period.

FIG. 11 shows the beginning part of field 1, in which in line 1 the horizontal sync signal is shifted by $\alpha=0.28$ μsec.

FIG. 12 shows the end part of field 1 and the beginning part of field 2, in which line 262 is entirely deleted, and in line 1 of field 2 the horizontal sync signal is shifted in accumulation by (8.94+0.28) μsec.

Figure 13:
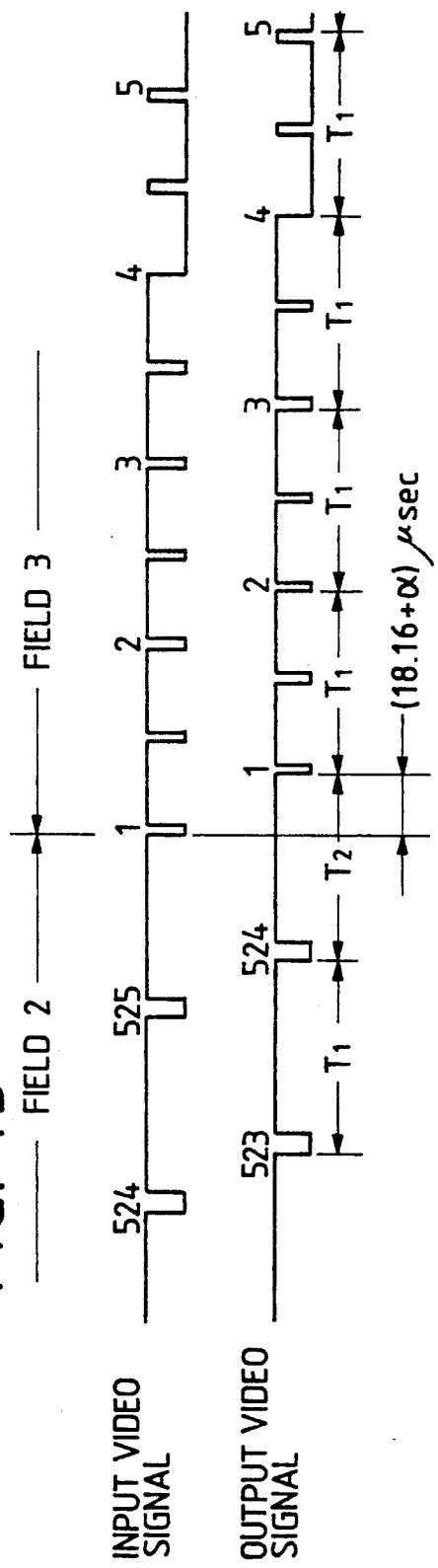

FIG. 13 shows the end part of field 2 and the beginning part of field 3, in which line 525 is entirely deleted, and in line 1 of field 3 the horizontal sync signal is shifted in accumulation by (18.16+0.28) μsec.

Figure 14:
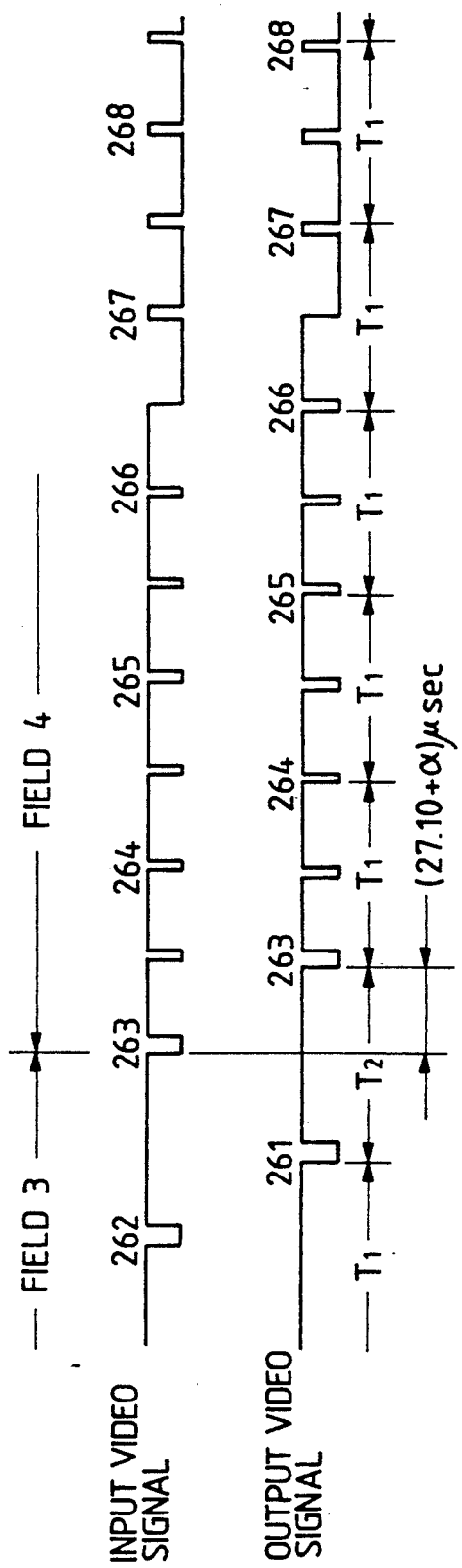

FIG. 14 shows the end part of field 3 and the beginning part of field 4, in which line 262 of field 3 is entirely deleted, and in line 1 of field 4 the horizontal sync signal is shifted in accumulation by (27.10+0.28) μsec.

FIG. 15 shows the end part of field 4 and the beginning part of field 5, in which line 525 of field 4 is entirely deleted, and in line 1 of field 5 the horizontal sync signal is shifted in accumulation by (36.32+0.28) μsec.

Figure 17:
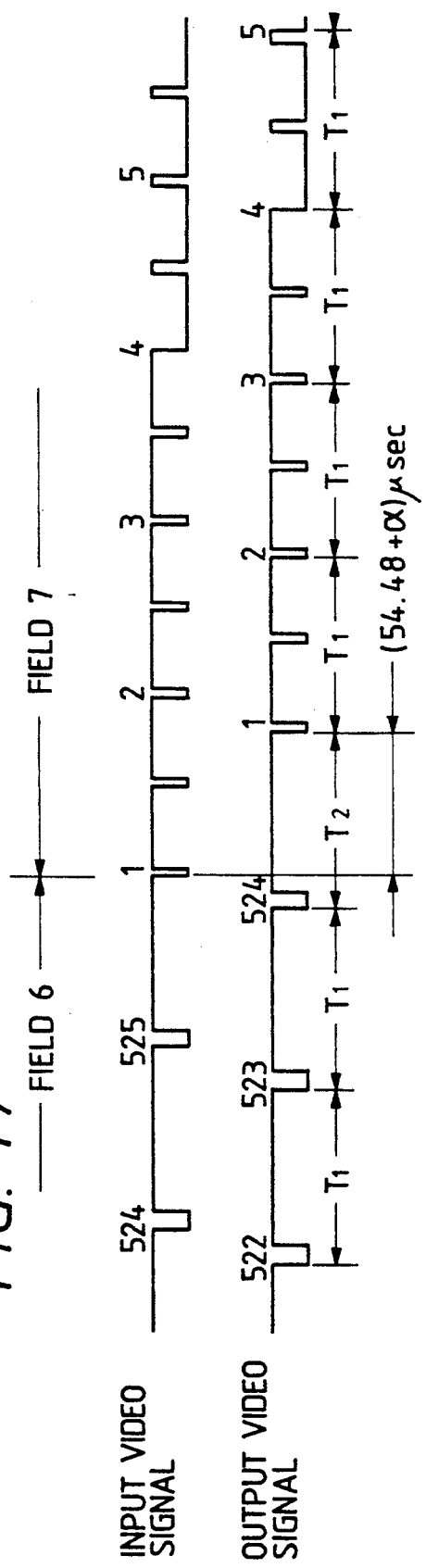
Figure 18:
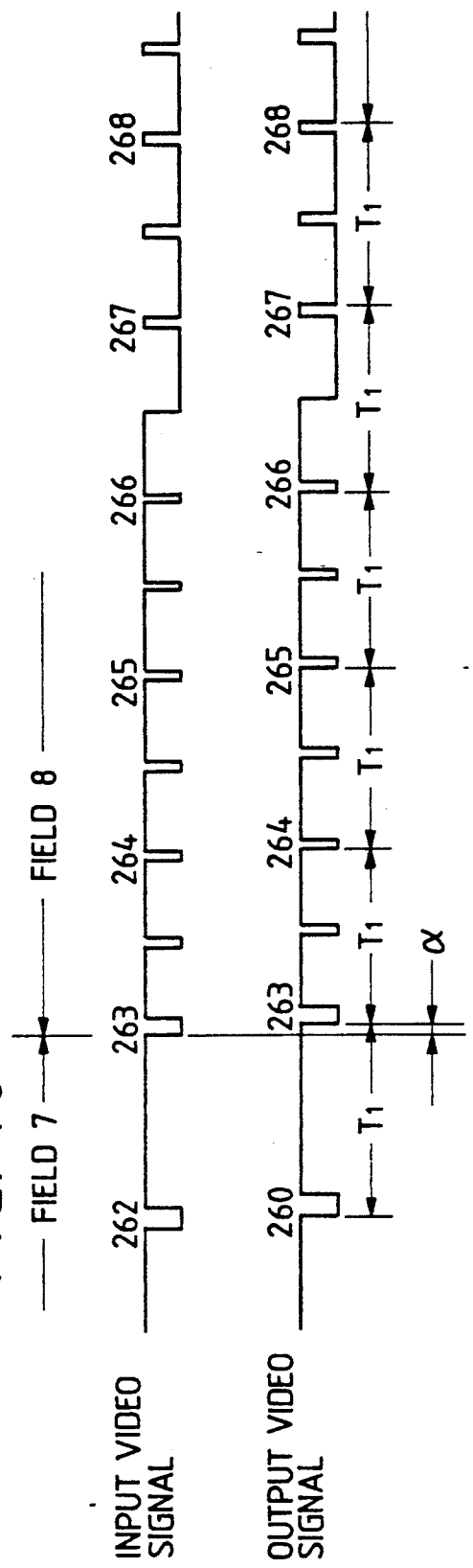

The same operation is repeated as shown in FIGS. 16 and 17. FIG. 18 shows the end part of field 7 and the beginning part of field 8, in which in field 7 lines 261 and 262 are entirely deleted to reset the accumulated shift time, and in line 1 of field 8 the horizontal sync signal has a shift time of $\alpha=0.28$ μsec. It is understood that fields 1–7 constitutes one cycle of the elongating operation.

FIGS. 19(a)–19(f) are timing charts for a description of an operation of elongating the horizontal period at the rate of $\alpha$ (0.28 μsec) per line, and respectively show the input analog signal a, write clock signal Wck, write reset signal Wrst, read clock signal Rck, read reset signal Rrst, and output analog video signal c.

FIG. 20(a)–20(f) are timing charts for a description of an operation of deleting one entire line, i.e., line 262. Line 262 is entirely deleted by providing the 2-line memory 214 with the read reset signal Rrst at the timing as shown in FIG. 20(e) to prohibit the reading of line 262. That is, line 263 is read out of the 2-line memory 214 after line 261. Line 525 can be deleted in the same manner.

FIG. 21(a)–21(f) are timing charts for a description of deleting two entire lines, i.e., lines 261 and 262 (see FIG. 18). The write clock signal Wck is suspended for two horizontal periods (63.5×2=127.0 μsec) as shown in FIG. 21(b), and the read reset signal Rrst is provided to the 2-line memory 214 at the timing of FIG. 21(e).

Although the aforementioned embodiments have dealt with the case where both the horizontal sync signal portions and the VBI portions are compressed and expanded in the scrambling and descrambling operations, the invention can be applied to the case where only the horizontal sync signal portions are compressed and expanded.

Figure 7:
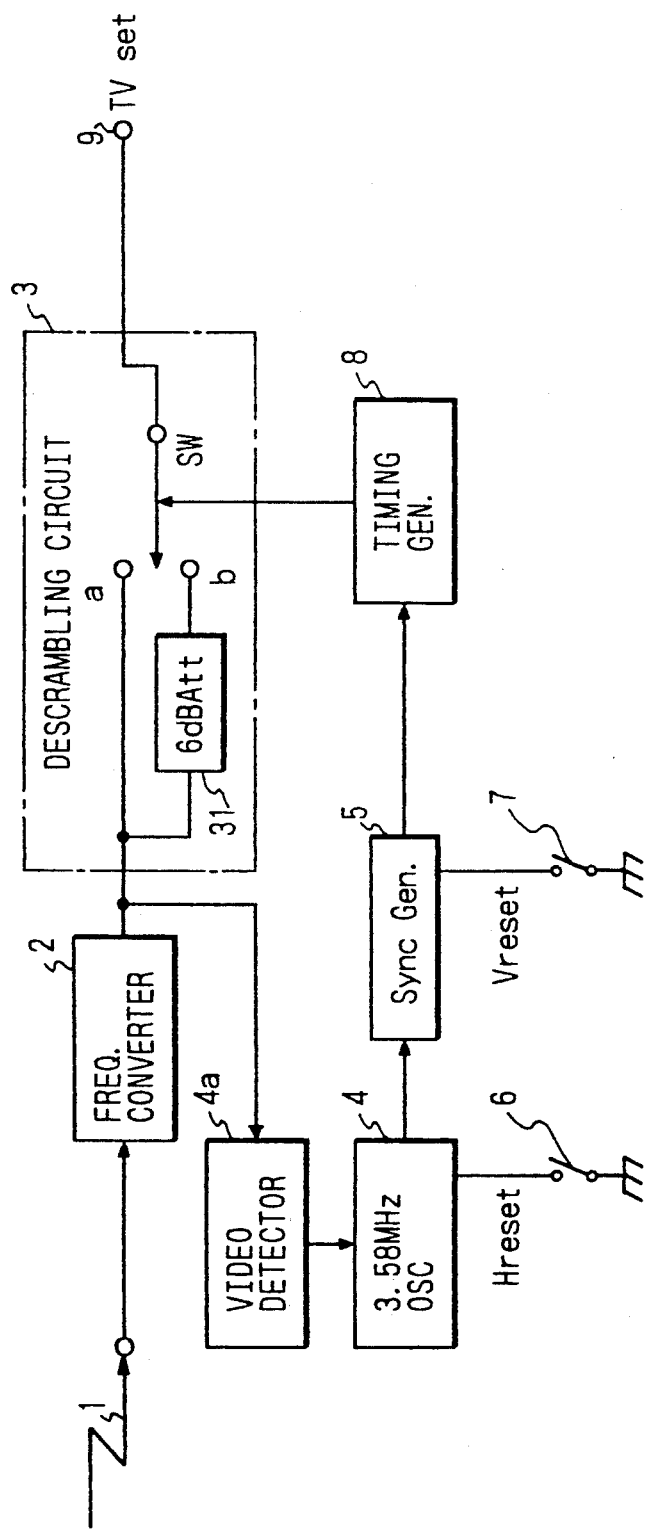
FIG. 7 is a block diagram showing an example of a conventional illegal descrambler.
Figure 8A:
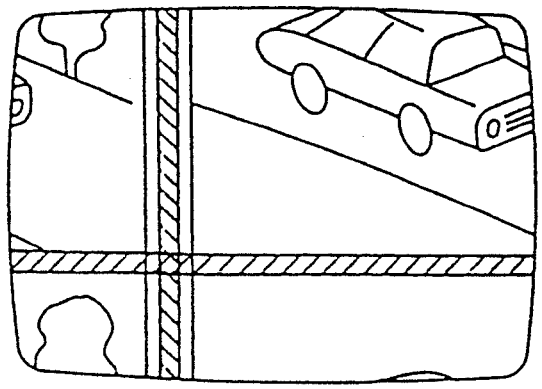
FIG. 8(a)–8(c) are explanatory views showing how to operate the illegal descrambler depicted in FIG. 7.
Figure 8B:
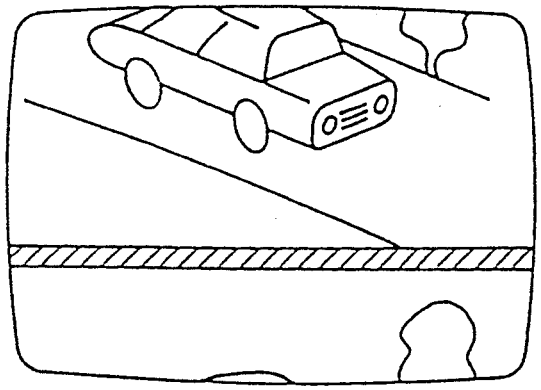
Figure 8C:
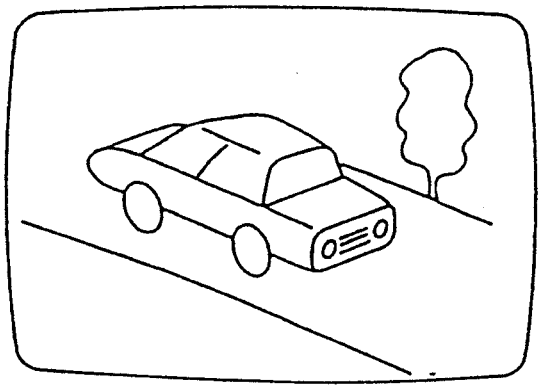

As described above, the compressing operation is performed by the encoder 12 after the input video signal has been elongated/shortened by means of the line memory 114 or 2-line memory 214 according to a predetermined pattern, and the compressed video signal is sent out to the terminals. As a result, even if the illegal descrambler as shown in FIG. 7 is used, the video signal cannot be descrambled successfully because the position of the horizontal sync signal H always changes. When, for example, elongation/shortening operation as shown in FIG. 4 is repeated on the center side, vertical bars will appear at the positions of (¼)H and (¾)H in the screen. When the scrambling of the second embodiment is employed on the center side, several black lines (flyback lines) will appear on the screen.

On the other hand, in the case where a regular terminal is installed, the positions of the horizontal sync signal portion and VBI portion compressed on the center side can be recognized exactly on the basis of the timing mode data and the key signal K sent from the center station. Consequently, in this case, the television signal can be descrambled to its original signal on the basis of the key signal K.

As described above, according to the present invention, a part of the television signal is elongated/shortened according to a predetermined pattern before it is sent out. Accordingly, the television signal cannot be descrambled by illegal descramblers which are now being put into practice. On the other hand, the television signal can be descrambled by GSS-type regular terminals presently in use. Accordingly, the sound operation of the CATV business can be secured.

What is claimed is:

1. A scrambling apparatus of a television signal including a video signal and an audio signal, comprising:
   analog-to-digital conversion means for converting a first video signal to a digital signal;
   memory means for storing the digital signal;
   timing generating means for providing a write clock and a read clock to the memory means to write the digital signal to and read the digital signal from the memory means, the provision of the read clock or write clock being temporarily suspended so that a corresponding part of the read-out digital signal is elongated or shortened, respectively, to change the length of a line of the video signal;
   digital-to-analog conversion means for converting the digital signal output from the memory means to a second video signal; and
   scrambling means for compressing a horizontal sync signal portion and/or a vertical blanking interval portion of the second video signal by a predetermined amount.

2. The apparatus according to claim 1, wherein the part of the read-out digital signal is elongated or shortened with a unit period longer than one field length, said unit period being a repetition period in which an accumulated elongation time returns to zero or reaches a one-line period.

3. The apparatus according to claim 2, wherein a temporary suspension time of the write and read clocks is varied with time.

4. The apparatus according to claim 1, wherein the part of the read-out digital signal is elongated/shortened according to a predetermined pattern.

5. The apparatus according to claim 1, wherein the part of the read-out digital signal continues to be elongated, and a one horizontal period part of the digital signal is deleted when an accumulated elongation time has reached or exceeded one horizontal period.

6. The apparatus according to claim 5, wherein the accumulated elongation time is made substantially zero every integer multiple of the field length.

7. The apparatus according to claim 5, wherein a temporary suspension time of the write and read clocks is an integer multiple of the period of the color burst signal.

8. The apparatus according to claim 5, wherein the memory means is a two-line memory.

9. The apparatus according to claim 1, wherein the scrambling means further superposing on the audio signal a key signal at a position corresponding to the horizontal sync signal portion and timing mode data indicating a positional relationship between the horizontal sync signal portion and the key signal.

10. A method for scrambling a television signal including a video signal and an audio signal, comprising the steps of:
    converting a first video signal to a digital signal;
    elongating/shortening a part of the digital signal to change the length of a line of the video signal;
    converting the elongated/shortened digital signal to a second video signal;
    compressing a horizontal sync signal portion and/or a vertical blanking interval portion of the second video signal by a predetermined amount.

11. The method according to claim 10, wherein the part of the digital signal is elongated or shortened by temporarily suspending a read operation or a write operation on a memory for storing the digital signal, respectively.

12. The method according to claim 10, wherein the part of the digital signal is elongated or shortened with a unit period longer than one field length, said unit period being a repetition period in which an accumulated elongation time returns to zero or reaches a one-line period.

13. The method according to claim 12, wherein a temporary suspension time of the write and read clocks is varied with time.

14. The method according to claim 10, wherein the part of the digital signal is elongated/shortened according to a predetermined pattern.

15. The method according to claim 10, wherein the part of the digital signal continues to be elongated, and a one horizontal period part of the digital signal is deleted when an accumulated elongation time has reached or exceeded one horizontal period.

16. The method according to claim 15, wherein the accumulated elongation time is made substantially zero every integer multiple of the field length.

17. The method according to claim 15, wherein a temporary suspension time of the write and read clocks is an integer multiple of the period of the color burst signal.

* * * * *